(12) United States Patent
Omata et al.

(10) Patent No.: US 9,065,378 B2
(45) Date of Patent: Jun. 23, 2015

(54) AC MOTOR CONTROL APPARATUS

(71) Applicant: DENSO CORPORATION, Kariya, Aichi-pref. (JP)

(72) Inventors: Ryuji Omata, Anjo (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 13/774,279

(22) Filed: Feb. 22, 2013

(65) Prior Publication Data

US 2013/0214709 A1   Aug. 22, 2013

(30) Foreign Application Priority Data

Feb. 22, 2012 (JP) ................. 2012-035962

(51) Int. Cl.
*H02P 21/00* (2006.01)
*H02P 1/46* (2006.01)
*H02P 21/14* (2006.01)

(52) U.S. Cl.
CPC .............. *H02P 21/14* (2013.01); *H02P 21/148* (2013.01)

(58) Field of Classification Search
CPC ..... H02P 21/14; H02P 21/148; Y02T 10/643; H02M 2007/53876
USPC ........................ 318/812; 307/151; 363/1–12
See application file for complete search history.

(56) References Cited

U.S. PATENT DOCUMENTS

| 6,229,719 | B1 | 5/2001 | Sakai et al. |
| 6,781,333 | B2 | 8/2004 | Koide et al. |
| 8,143,838 | B2 | 3/2012 | Akiyama |
| 2001/0002784 | A1 | 6/2001 | Masaki et al. |
| 2004/0051495 | A1 | 3/2004 | Kaneko et al. |
| 2004/0263114 | A1 | 12/2004 | Kaneko et al. |
| 2006/0006825 | A1 | 1/2006 | Inaguma et al. |
| 2007/0069681 | A1* | 3/2007 | Imura et al. .................. 318/717 |

(Continued)

FOREIGN PATENT DOCUMENTS

| GB | 2481328 | 12/2011 |
| JP | 2000-175483 | 6/2000 |

(Continued)

OTHER PUBLICATIONS

Omata et al, U.S. Appl. No. 13/774,619, filed Feb. 22, 2013.

(Continued)

*Primary Examiner* — Bentsu Ro
*Assistant Examiner* — Zemenay Truneh
(74) *Attorney, Agent, or Firm* — Nixon & Vanderhye PC

(57) ABSTRACT

A motor control circuit calculates an α-axis current iα and a β-axis current iβ in a fixed coordinate system based on a W-phase (sensor phase) of an AC motor. The control circuit calculates the α-axis current iα from a current iw.sns sensed in the W-phase, and the β-axis current iβ from a differentiated value Δiα determined from the variation quantity of the α-axis current based on that the α-axis current iα and the β-axis current iβ are in a relation of a sine wave and a cosine wave. Subsequently, the control circuit calculates a current phase $x\theta = \tan^{-1}(i\beta/i\alpha)$ relative to the W-phase. Subsequently, the control circuit calculates an estimation factor according to the current phase xθ and determines an estimated current iu.est in the U-phase of the AC motor by multiplying the sensed current iw.sns by the calculated estimation factor.

7 Claims, 7 Drawing Sheets

(56) References Cited

U.S. PATENT DOCUMENTS

| | | | |
|---|---|---|---|
| 2008/0079385 A1* | 4/2008 | Hashimoto et al. | 318/801 |
| 2008/0129243 A1 | 6/2008 | Nashiki | |
| 2008/0157709 A1* | 7/2008 | Tobari et al. | 318/801 |
| 2009/0160377 A1* | 6/2009 | Yamada | 318/400.02 |
| 2010/0123418 A1 | 5/2010 | Itoh et al. | |
| 2010/0194329 A1 | 8/2010 | Lu et al. | |
| 2010/0207555 A1 | 8/2010 | Ide et al. | |
| 2011/0248659 A1 | 10/2011 | Balazovic et al. | |
| 2011/0273127 A1 | 11/2011 | Imamura et al. | |
| 2012/0007528 A1* | 1/2012 | Nakatsugawa et al. | 318/400.02 |
| 2012/0212162 A1 | 8/2012 | Wu et al. | |

FOREIGN PATENT DOCUMENTS

| | | | | |
|---|---|---|---|---|
| JP | 2001-309697 | | 11/2001 | |
| JP | 2004-159391 | * | 6/2004 | H02P 21/00 |
| JP | 2008-132920 | | 6/2008 | |
| WO | WO 2010/087224 | | 8/2010 | |

OTHER PUBLICATIONS

Omata et al, U.S. Appl. No. 13/774,667, filed Feb. 22, 2013.
Omata et al, U.S. Appl. No. 13/774,590, filed Feb. 22, 2013.
Omata et al, U.S. Appl. No. 13/774,295, filed Feb. 22, 2013.
Office Action (1 page) dated Jan. 24, 2014 issued in corresponding Japanese Application No. 2012-035961 and English translation (1 page).
Office Action (15 pages) dated Feb. 6, 2015 issued in co-pending U.S. Appl. No. 13/774,667.
Notice of Allowance dated Mar. 17, 2015 issued in co-pending U.S. Appl. No. 13/774,590.
Office Action (11 pgs.) dated Aug. 19, 2014 issued in co-pending U.S. Appl. No. 13/774,590.
Office Action (11 pages) dated Feb. 13, 2015 issued in co-pending U.S. Appl. No. 13/774,619.
Office Action (11 pgs.) dated Oct. 6, 2014 issued in co-pending U.S. Appl. No. 13/774,619.
Office Action (11 pgs.) dated Oct. 8, 2014 issued in co-pending U.S. Appl. No. 13/774,667.

* cited by examiner

AC MOTOR CONTROL APPARATUS

CROSS REFERENCE TO RELATED APPLICATION

The present application is based on and incorporates herein by reference Japanese patent application 2012-35962 filed on Feb. 22, 2012.

TECHNICAL FIELD

The present disclosure relates to an AC motor control apparatus including a three-phase motor and a current sensor for sensing a current in one phase of the motor.

BACKGROUND

In recent years, because of the global need for lower fuel consumption and less exhaust emission, electric and hybrid vehicles mounted with an AC motor as a mechanical power source are proposed. By way of example, a hybrid vehicle is mounted with a DC power supply, which may be a secondary battery, an electric power converter, which includes inverters, and AC motors. The power supply is connected to the motors via the power converter. The inverters convert the DC voltage from the power supply into AC voltages for driving the motors.

The hybrid or electric vehicle is provided with a control apparatus, which includes two or three current sensors for sensing the currents in two phases or three phases of a three-phase motor. The apparatus controls the motor according to the outputs (sensed currents) from the current sensors. Thus, it is necessary to provide two or three current sensors for each of motors. This results in a bar to simplification of the parts of the inverter that include three-phase output terminals. This also results in a bar to reduction of the cost of a motor control system of the vehicle.

Patent document 1 (JP-A-2010-124544, US 2010/0123418) and patent document 2 (JP-A-2004-159391) disclose improved control apparatuses.

Specifically, patent document 1 discloses a technique effective for improving the vehicle fuel consumption rate in an AC motor control apparatus. This technique is a method for driving the AC motor by means of square wave control (one pulse switching in one current supply cycle period). The rectangular wave control is the torque feedback control that includes: calculating, without current commands for the d-axis and q-axis, an estimated torque from a d-axis current and a q-axis current that are sensed by current sensors; and so controlling the voltage vector phase that the estimated torque follows up a command torque. The rectangular wave control is adopted in operating ranges where a weak field current needs to flow. This control is effective in improving the fuel consumption rate (reducing the inverter loss) because the control makes it possible to minimize the weak field current and the number of times the inverters are switched.

Patent document 2 discloses a technique for lowering the cost of production by reducing the number of current sensors. This technique includes: providing a current sensor for sensing the current in one phase (for example, U-phase) of an AC motor; and calculating estimated currents in the other two phases (for example, V-phase and W-phase) from the sensed current, a d-axis command current, a q-axis command current, and an electrical angle of the motor.

Specifically, this technique includes: determining a U-phase current phase angle $\theta'$ $(=\theta+\alpha)$ by adding the command current phase angle $\alpha$ between the q-axis and the vector resultant from the d-axis command current Id* and q-axis command current Iq* of the AC motor to the angle $\theta$ between the rotor of the motor and the U-phase axis of the stator of the motor; calculating a current amplitude Ia from the U-phase current phase angle $\theta'$ and the sensed current Iu in the U-phase according to the following equation (A); calculating estimated currents Iv and Iw in the V-phase and W-phase respectively from the current amplitude Ia and U-phase current phase angle $\theta'$ according to the following equations (B) and (C); calculating an estimated d-axis current Id and an estimated q-axis current Iq from the sensed current Iu in the U-phase and the estimated currents Iv and Iw in the V-phase and W-phase respectively; and performing the feedback control of the current in the AC motor by so calculating a command voltage for the motor that the estimated currents Id and Iq equal the command current Id* and Iq* respectively.

$$Ia = Iu/[\sqrt{1/3} \times \{-\sin(\theta')\}] \quad (A)$$

$$Iv = \sqrt{(1/3)} \times Ia \times \{-\sin(\theta'+120°)\} \quad (B)$$

$$Iw = \sqrt{(1/3)} \times Ia \times \{-\sin(\theta'+240°)\} \quad (C)$$

A control apparatus for an AC motor for driving an electric or hybrid vehicle requires rectangular wave control as disclosed in patent document 1. However, because this control apparatus does not have d-axis and q-axis current commands, it is impossible to apply to the control apparatus a method of using d-axis and q-axis current commands as disclosed in patent document 2.

SUMMARY

It is therefore an object to provide an AC motor control apparatus that enables torque feedback control by calculating an estimated current in one phase from a current sensed in another by a current sensor in rectangular wave control without d-axis and q-axis current commands.

According to one aspect, an AC motor control apparatus is provided for a system, which includes a three-phase AC motor having a first phase, a second phase and a third phase, an inverter for driving the AC motor and a current sensor for sensing a current flowing in the first phase. The AC motor control apparatus includes a controlling part for controlling electric power supply to the AC motor. The controlling part includes a current estimating part. The current estimating part calculates a current phase relative to the first phase from an $\alpha$-axis current and a $\beta$-axis current in a fixed coordinate system set with an $\alpha$-axis and a $\beta$-axis. The $\alpha$-axis extends in a same direction as an axis of the first phase extends. The $\beta$-axis is perpendicular to the axis of the first phase. The current estimating part calculates an estimated current in at least the second phase from the current phase relative to the first phase and the sensed current in the first phase. The current estimating part calculates the $\alpha$-axis current from the sensed current in the first phase and calculates the $\beta$-axis current from a differentiated value of the $\alpha$-axis current.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

A motor control apparatus will be described below with reference to one embodiment, which is applied to a driving system of a hybrid vehicle mounted with AC motors and an internal combustion engine as mechanical power units.

Figure 1:
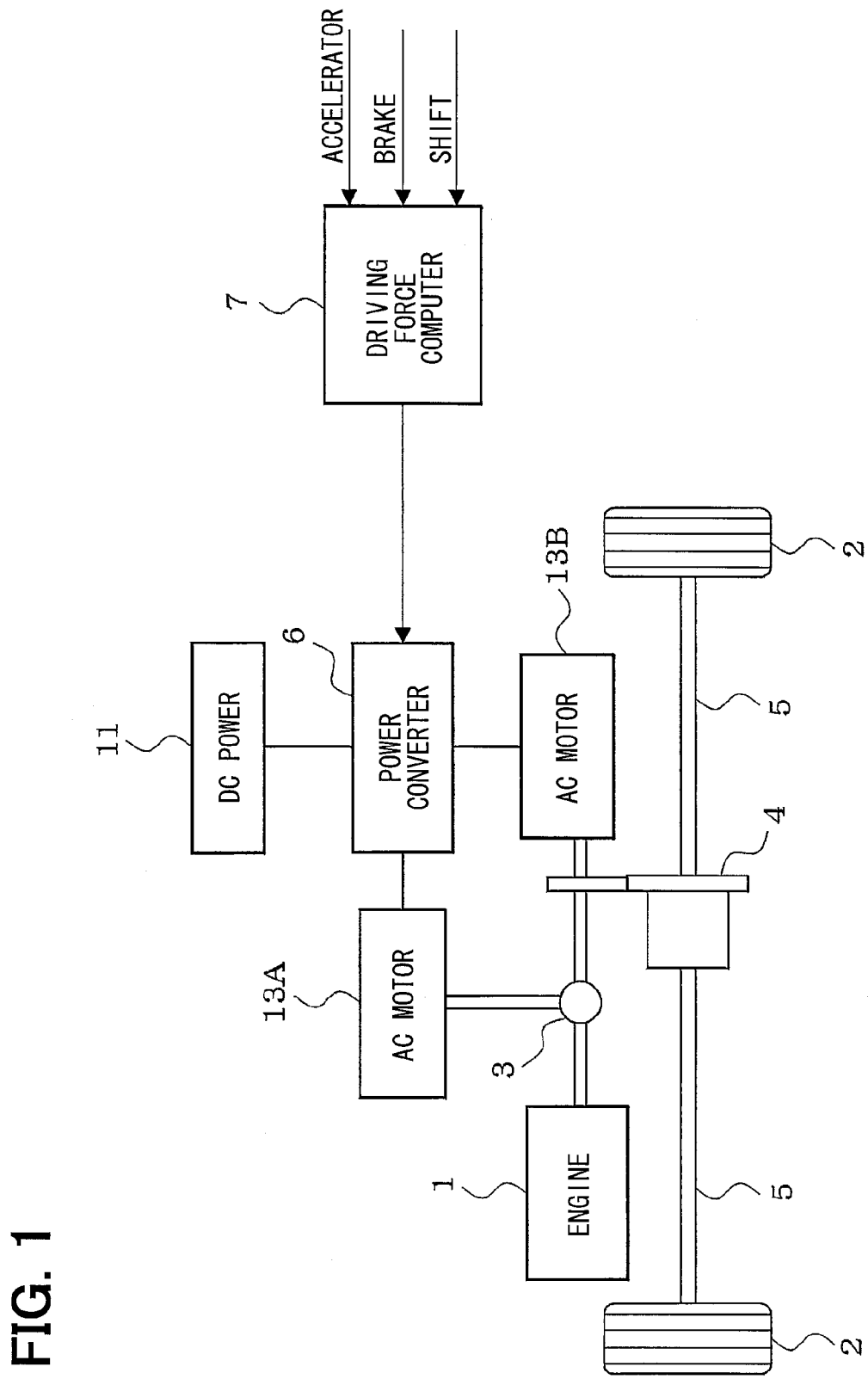
FIG. 1 is a schematic diagram of a driving system of a hybrid vehicle.

Referring to FIG. 1, a hybrid vehicle is mounted with an internal combustion engine 1, a first AC motor 13A, and a second AC motor 13B. The driving of the first AC motor 13A by the output from the engine 1 transmits driving force to a shaft of the second AC motor 13B. Mainly, the transmitted driving force and the driving force of the second AC motor 13B drive tire wheels 2 fixed to an axle 5. The crankshaft of the engine 1 and the shafts of the motors 13A and 13B are coupled together by a mechanical power divider 3 (for example, a planetary gear mechanism). The shaft of the second AC motor 13B is coupled to the axle 5 by a differential reduction gear 4. The motors 13A and 13B are connected to a DC power supply 11, which may be a secondary battery, via an electric power converter 6, which includes inverters. The motors 13A and 13B transmit electric power to the power supply 11 and receive electric power from it through the converter 6.

A driving force computer circuit 7 includes a computer for controlling the whole vehicle. The computer circuit 7 detects an operating state of the vehicle by reading in an accelerator signal output from an accelerator sensor (not shown), a brake signal output from a brake switch (not shown), a shift signal output from a shift switch (not shown), and signals output from other sensors and switches. The computer circuit 7 exchanges control signals, data signals, etc. with an engine control circuit (not shown), which controls the operation of the engine 1, and a motor control circuit 16 (FIG. 2), which controls the operation of the motors 13A and 13B. The computer circuit 7 controls the driving force of the engine 1 and motors 13A and 13B by outputting a driving force requirement according to the operating state of the vehicle.

Figure 2:
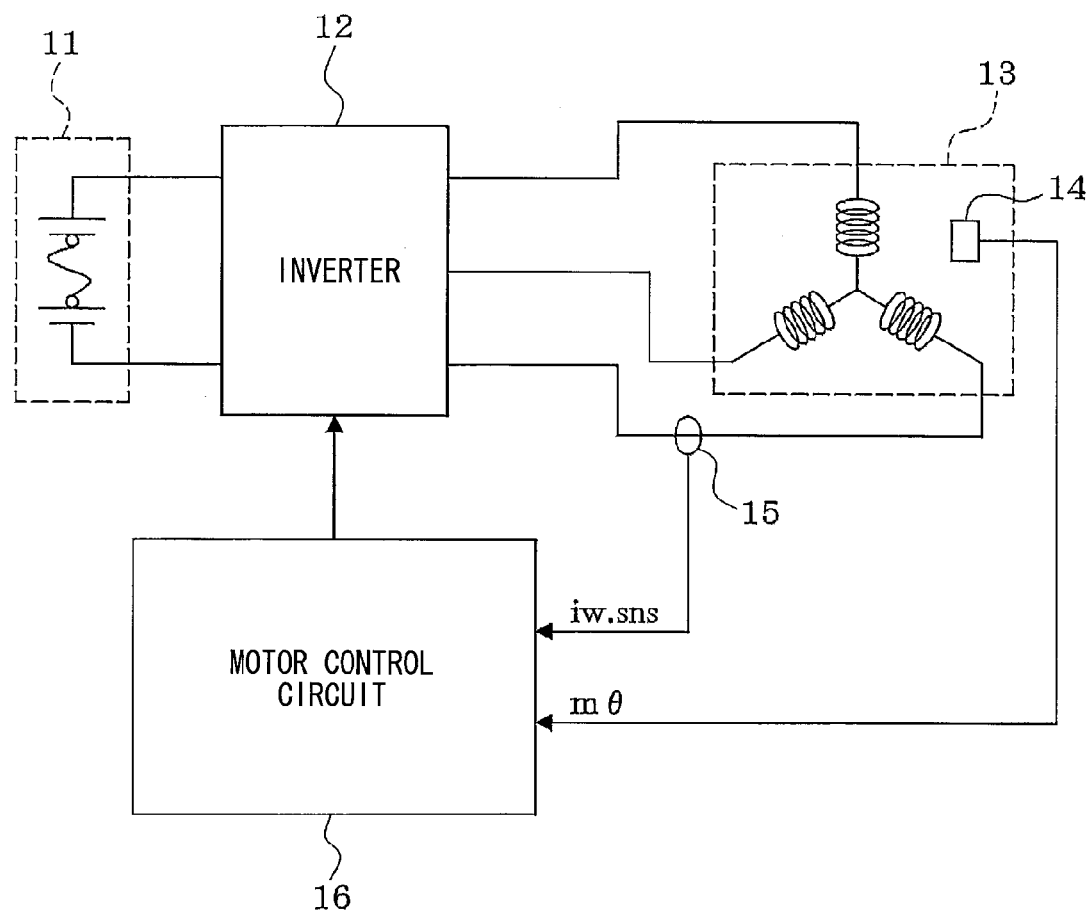
FIG. 2 is a schematic diagram of an AC motor control apparatus, which is applied to the driving system shown in FIG. 1, according to an embodiment.

As shown in FIG. 2, the AC motor control apparatus is mounted on the hybrid vehicle. Because the AC motor control apparatus for the AC motors 13A and 13B are substantially identical in structure, the AC motor control apparatus for an AC motor 13 representing the motors 13A and 13B will be described below.

The DC power supply 11, which may be a secondary battery, is connected to a voltage-controlled three-phase inverter 12, which drives the AC motor 13. Alternatively, the power supply 11 may be connected to the inverter 12 via a boost converter or the like.

The AC motor 13 is a three-phase permanent-magnet synchronous motor with permanent magnets in its rotor. The motor 13 is mounted with a rotational position sensor 14 (for example, a resolver) for sensing the rotational position (rotational angle) of the rotor. The motor 13 is also mounted with only one current sensor 15 for sensing the current in one phase (sensor phase) of the motor 13. The current sensor 15 senses the current flowing in the W-phase as the sensor phase of the motor 13. The motor 13 may not be a permanent-magnet synchronous motor, but may be an induction motor or another synchronous motor. The sensor phase, for example W-phase, is exemplarily referred to as a first phase, and U-phase and V-phase are referred to as a second phase and a third phase.

The inverter 12 converts the DC voltage from the DC power supply 11 into three-phase voltages U, V, and W in accordance with six three-phase arm voltage command signals UU, UL, VU, VL, WU and WL output from the motor control circuit 16 (controlling part). The inverter 12 drives the AC motor 13 by applying the voltages U, V, and W to the motor 13.

The motor control circuit 16 adjusts the three-phase voltages U, V and W by so performing the switching control of the inverter 12 that the torque output from the AC motor 13 equals a target torque (command torque). A part for doing so is a method that includes sensing the current in the W-phase of the motor 13 and so performing feedback control (torque feedback control) as to reduce the deviation between the command torque and an estimated torque based on the output from the current sensor 15.

Figure 3:
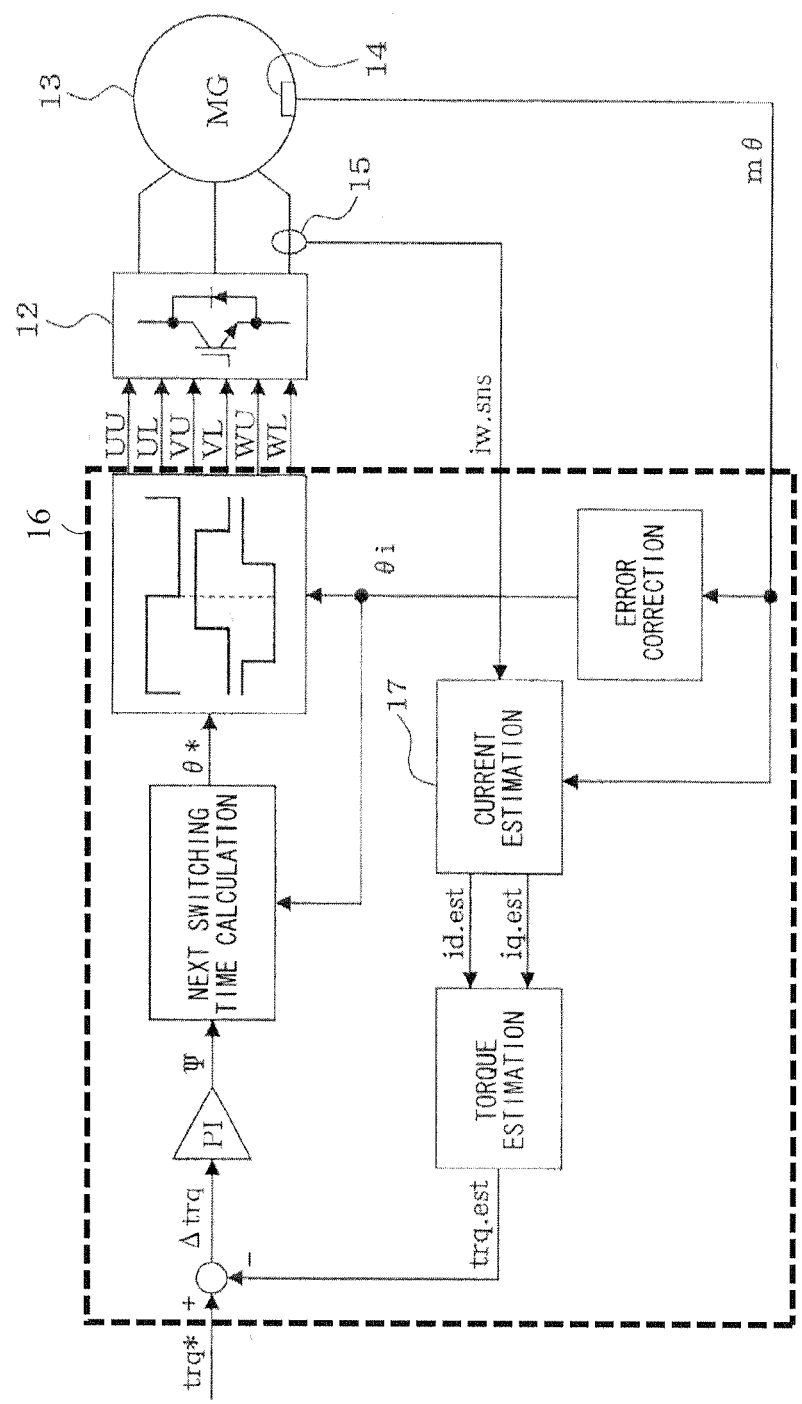
FIG. 3 is a block diagram showing torque feedback control for an AC motor of the hybrid vehicle.

With reference to FIG. 3, the motor control circuit 16 computes a rotational position signal θi (which an error correction part converts into an electrical angle eθ in order to decide switching time points according to a current period). The position signal θi is a corrected error in the rotational rotor position mθ (rotational angle) sensed by the rotational position sensor 14. From the current iw.sns sensed in the W-phase of the AC motor 13 by the current sensor 15 and the electrical angle eθ determined from the rotational position mθ, a current estimation part 17 (current estimating part), which will be described later, computes an estimated d-axis current id.est and an estimated q-axis current iq.est (which can be expressed as an estimated current vector) in a rotating coordinate system (d-q coordinate system) set as the rotating coordinate of the rotor.

Subsequently, the motor control circuit 16 computes an estimated torque trq.est from the estimated d-axis current id.est and q-axis current iq.est according to a data map, a numerical equation or the like. The motor control circuit 16 so computes a command voltage phase ψ by means of proportional and integral (PI) control or the like as to reduce the torque deviation Δtrq between a command torque trq* and the estimated torque trq.est. The motor control circuit 16 computes the next switching time point θ* from the command voltage phase ψ and the rotational position signal θi. The motor control circuit 16 generates three-phase six-arm voltage command signals UU, UL, VU, VL, WU and WL for six switching transistors (not shown) based on the switching time point θ* and the rotational position signal θi by means of rectangular wave control. The motor control circuit 16 outputs the three-phase six-arm voltage command signals UU, UL, VU, VL, WU and WL to the inverter 12. The inverter 12 converts the DC voltage into three-phase voltages in accordance with the command signals UU, UL, VU, VL, WU and WL and applies the three-phase voltages to the AC motor 13. This causes three-phase currents to flow in the motor 13, generating a torque. The motor control circuit 16 detects the alternating current in the W-phase of the motor 13 and so performs feedback control (torque feedback control) as to reduce the deviation between the command torque trq* and the estimated torque trq.est based on the output from the current sensor 15 so that the generated torque can equal the target torque (command torque).

A method for estimating the current in the AC motor 13 by means of the current estimation part 17 will be described below.

Generally, the currents iu, iv and iw respectively in the three phases of the AC motor 13 vary at a phase difference of 120 degrees between them with the electrical angle e$\theta$, the amplitude and phase of a current vector, and so on. By way of example, for the calculation of an estimated current iu.est in the U-phase of the motor 13 from the sensed W-phase current iw.sns, the current estimation part 17 may use the electrical angle x$\theta$ that is 0 degree when the sensed current iw.sns crosses zero (0 ampere) from a negative polarity to a positive polarity, and that is 180 degrees when this current crosses zero from the positive polarity to the negative polarity. The angle x$\theta$ is a current phase relative to the W-phase, and is equivalent to the angle between the W-phase and the current vector. In this case, the sensed current iw.sns and the estimated U-phase current iu.est can be expressed respectively by the following equations (1) and (2), where Ia is the current amplitude.

$$iw.sns = Ia \times \sin(x\theta) \tag{1}$$

$$iu.est = Ia \times \sin(x\theta - 120°) \tag{2}$$

By using the relationship expressed by the equation (1), it is possible to transform the equation (2) as follows.

$$\begin{aligned} iu \cdot est &= Ia \times \sin(x\theta - 120°) \\ &= -\frac{1}{2} \times Ia \times \sin(x\theta) - \frac{\sqrt{3}}{2} \times Ia \times \cos(x\theta) \\ &= -\frac{1}{2} \times iw \cdot sns - \frac{\sqrt{3}}{2} \times \frac{Ia \times \sin(x\theta)}{\tan(x\theta)} \\ &= \left\{ -\frac{1}{2} - \frac{\sqrt{3}}{2} \times \frac{1}{\tan(x\theta)} \right\} \times iw \cdot sns \end{aligned}$$

This makes it possible to express the estimated U-phase current iu.est in the U-phase with the sensed W-phase current iw.sns and the current phase x$\theta$ relative to the W-phase by the following equation (3). This also makes it possible to express the estimated U-phase current iu.est to be expressed with an estimation factor fu(x$\theta$) according to the current phase x$\theta$ by the following equation (4).

$$iu \cdot est = \left\{ -\frac{1}{2} - \frac{\sqrt{3}}{2} \times \frac{1}{\tan(x\theta)} \right\} \times iw \cdot sns \tag{3}$$

$$iu \cdot est = fu(x\theta) \times iw \cdot sns \tag{4}$$

$$\text{where } fu(x\theta) = -\frac{1}{2} - \frac{\sqrt{3}}{2} \times \frac{1}{\tan(x\theta)} \tag{5}$$

Figure 4:
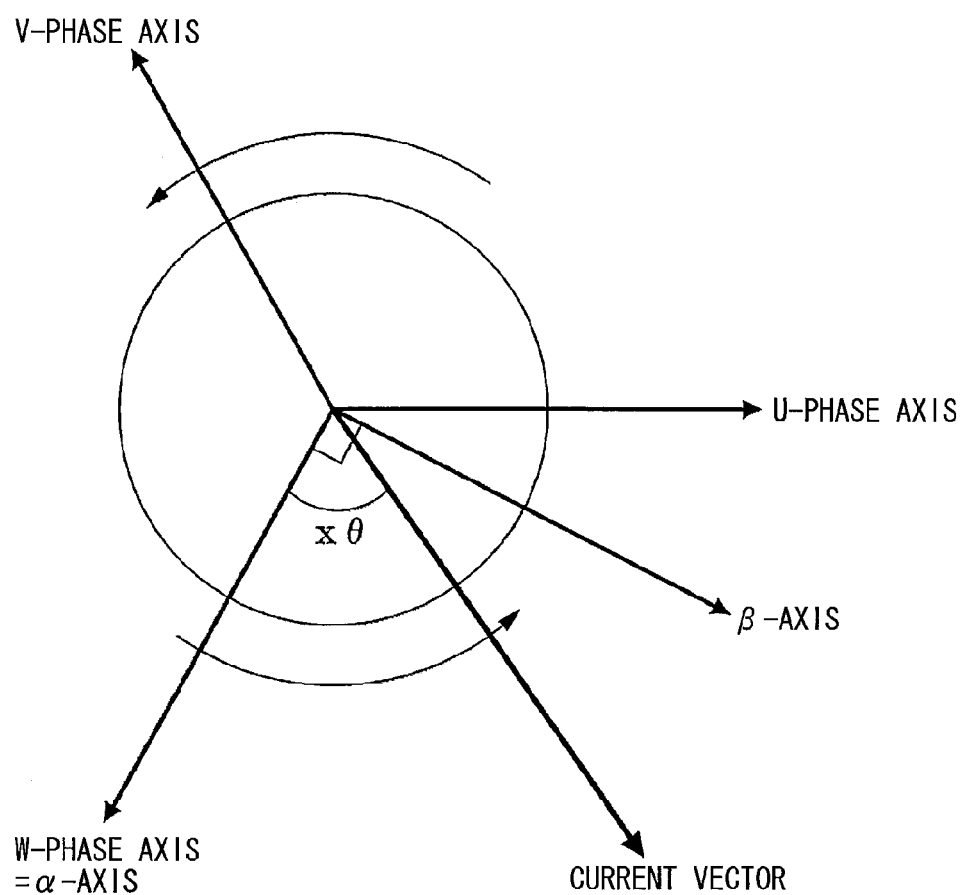
FIG. 4 shows a fixed coordinate system (α-β coordinate system) on a basis of a W-phase of the AC motor.

FIG. 4 shows a fixed coordinate system ($\alpha$-$\beta$ coordinate system) set with an $\alpha$-axis and a $\beta$-axis. The $\alpha$-axis and W-phase axis extend in the same direction. The $\beta$-axis is perpendicular to the W-phase axis. By calculating an $\alpha$-axis current i$\alpha$ and a $\beta$-axis current i$\beta$ in the fixed coordinate system, which is set on the basis of the W-phase, it is possible to determine the current phase x$\theta$ relative to the W-phase from the currents i$\alpha$ and i$\beta$ according to the following equation (6). For the calculation of the current phase x$\theta$ as $\tan^{-1}$, this phase may, depending on the definition of the currents i$\alpha$ and i$\beta$, not be an angle synchronous with the W-phase. This depends on axis definition (for example, an exchange of the $\alpha$-axis and $\beta$-axis or sign change). In order that the current phase x$\theta$ may be 0 degree when the sensed W-phase current iw.sns crosses zero (0 ampere) from the negative polarity to the positive polarity, and that the phase x$\theta$ may be 180 degrees (an angle synchronous with the W-phase) when the sensed current iw.sns crosses zero from the positive polarity to the negative polarity, the phase x$\theta$ may be calculated after an exchange of the currents i$\alpha$ and i$\beta$ or sign handling, or otherwise the phase difference of ±90 degrees due to the perpendicular relationship may suitably be added directly to or subtracted directly from the phase x$\theta$.

$$x\theta = \tan^{-1}(i\beta/i\alpha) \tag{6}$$

The $\alpha$-axis current i$\alpha$ can be expressed with the currents iu, iv and iw respectively in the three phases by the following equation (7), where K is a conversion factor.

$$i\alpha = K \times \{iw - (1/2) \times iu - (1/2) \times iv\} \tag{7}$$

The equation (7) can be transformed into the following equation (8) according to the relationship iu+iv+iw=0 (Kirchhoff's law).

$$i\alpha = K \times (3/2) \times iw \tag{8}$$

By using the sensed W-phase current iw.sns as the W-phase current iw in the equation (8), it is possible to obtain the following equation (9).

$$i\alpha = K \times (3/2) \times iw.sns \tag{9}$$

The $\beta$-axis current i$\beta$ can be calculated from a differentiated (differential) value $\Delta i\alpha$ of the $\alpha$-axis current, with attention to the phase difference of 90 degrees between the $\alpha$-axis current i$\alpha$ and $\beta$-axis current i$\beta$ (i.e., the currents i$\alpha$ and i$\beta$ are a sine wave and a cosine wave). A method for calculating the $\beta$-axis current i$\beta$ will be described below.

The current estimation part 17 calculates a differentiated value $\Delta i\alpha$ of the $\alpha$-axis current from the variation quantity of this current during a sampling interval Ts [rad] (difference between the present value i$\alpha$(n) and previous value i$\alpha$(n−1) of the $\alpha$-axis current i$\alpha$) according to the following equation (10). The sampling interval Ts is the number of radians representing the electrical angle (for example, 30 degrees) equivalent to the interval. The positive and negative signs may change depending on the definition of the currents i$\alpha$ and i$\beta$. However, the signs may be handled suitably at need so that the sine and cosine waves necessary for the calculation of $\tan^{-1}$ can be obtained.

$$\Delta i\alpha = -\{i\alpha(n) - i\alpha(n-1)\}/Ts \tag{10}$$

Figure 5A:
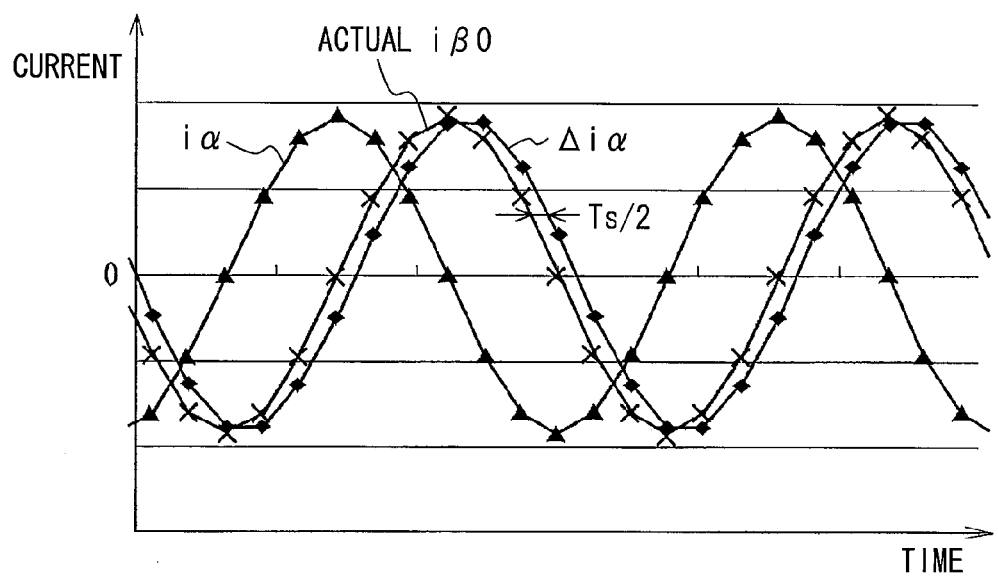
FIGS. 5A and 5B are time charts of a method of calculation of a β-axis current iβ.
Figure 5B:
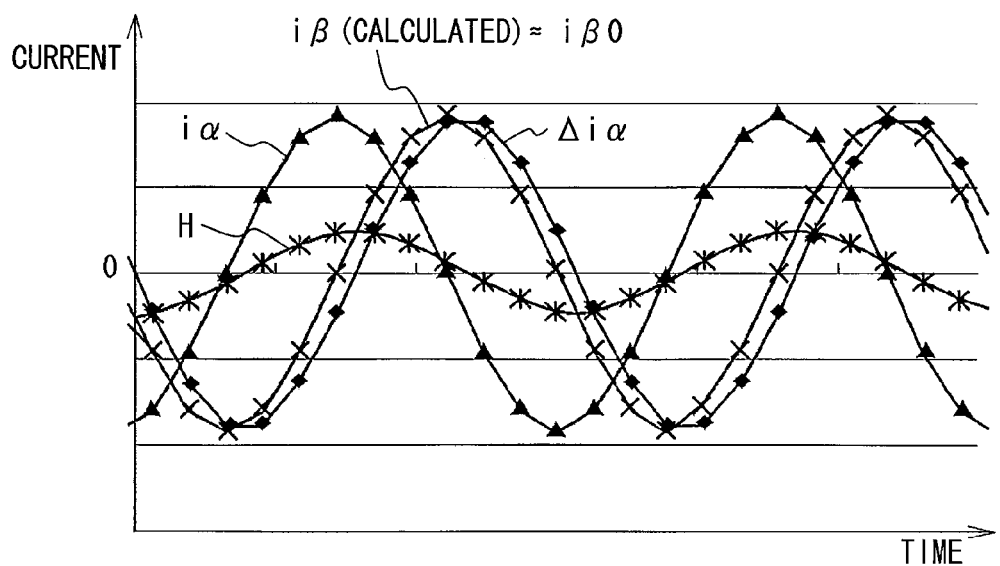

According to the Applicant's research, if a differentiated value $\Delta i\alpha$ of the $\alpha$-axis current is calculated from the variation quantity of this current during the sampling interval Ts, for example, an examination with an ideal sine wave proves that, as shown in FIG. 5A, the waveform of the differentiated value $\Delta i\alpha$ has a phase delay of Ts/2 (½ of the sampling interval Ts) relative to the waveform of the actual $\beta$-axis current i$\beta$0. The examination also proves that, as shown in FIG. 5B, a correction quantity H corresponding to the phase delay of Ts/2 (a correction quantity for the correction of the phase delay of Ts/2) is the product of Ts/2 and the average of the present value i$\alpha$(n) and previous value i$\alpha$(n−1) of the $\alpha$-axis current.

$$H = \{i\alpha(n) + i\alpha(n-1)\}/2 \times (Ts/2) \tag{11}$$

Accordingly, it is possible to calculate the $\beta$-axis current i$\beta$ accurately from each differentiated value $\Delta i\alpha$ of the $\alpha$-axis current and the associated correction quantity H corresponding to the phase delay of Ts/2 according to the following equation (12) (i.e., calculate the β-axis current iβ by correcting each differentiated value Δiα with the associated correction quantity H).

$$i\beta = \Delta i\alpha + H \quad (12)$$
$$= -\{i\alpha(n) - i\alpha(n-1)\}/Ts + \{i\alpha(n) - i\alpha(n-1)\}/2 \times (Ts/2)$$

It is possible to mathematically prove (I) that, on an ideal sine wave, the phase delay of the differentiated value of the α-axis current is Ts/2 relative to the actual β-axis current, and (II) that the correction quantity for correcting the delay is the product of Ts/2 and the average of the present and previous values of the α-axis current.

The above method for calculating the β-axis current iβ is one example. The β-axis current iβ could be calculated accurately by another method.

Figure 6:
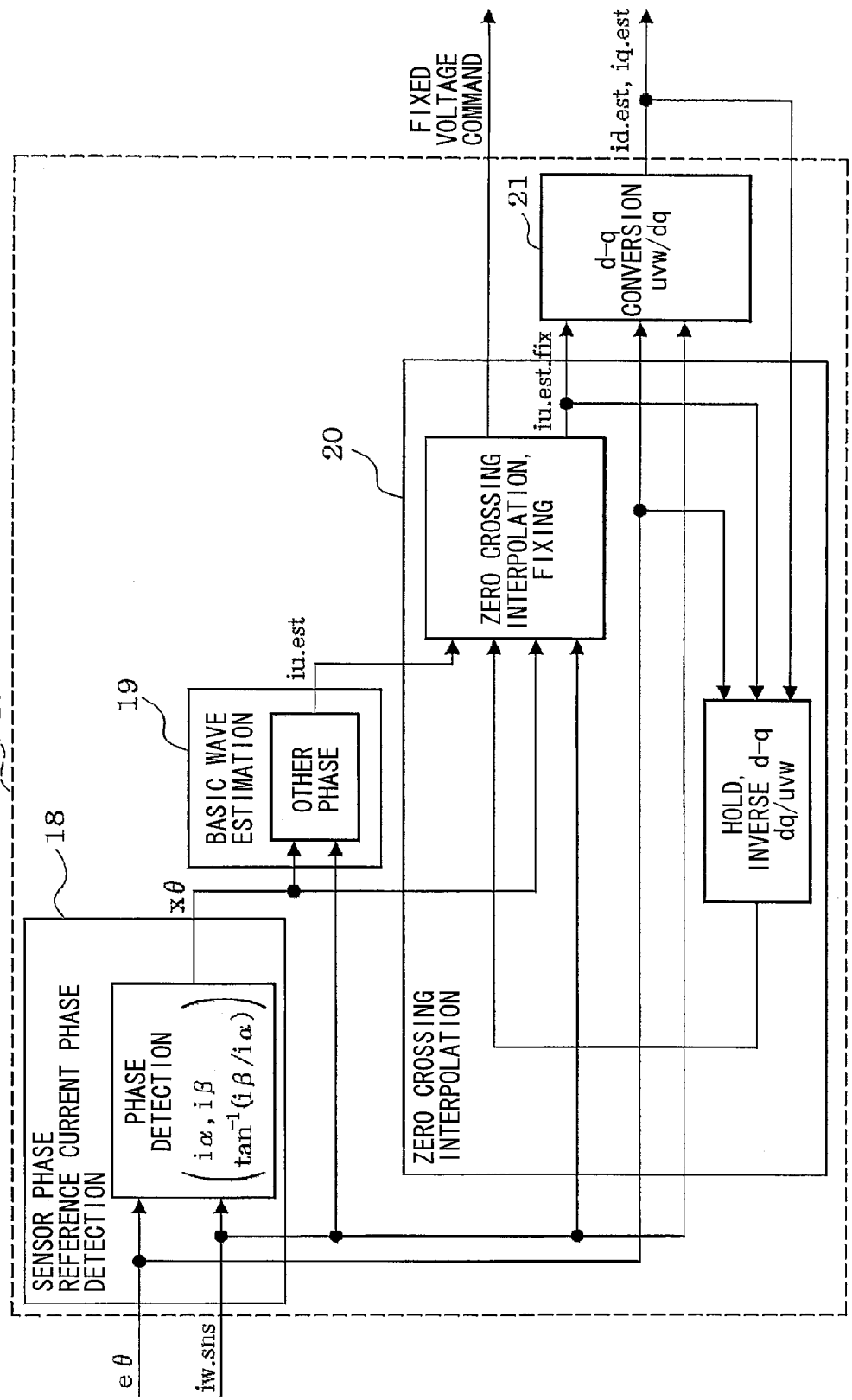
FIG. 6 is a block diagram of a current estimation part of the AC motor control apparatus.

With reference to FIG. 6, the current estimation part 17 includes a sensor phase current phase detection part 18, a basic wave estimation part 19, a zero-crossing time point interpolation part 20, and a d-q conversion part 21. In this embodiment, the estimation part 17 estimates the current in the AC motor 13 as follows.

The current phase detection part 18 calculates the α-axis current iα according to the equation (9) from the current iw.sns sensed in the W-phase by the current sensor 15. Subsequently, the detection part 18: calculates the differentiated value Δiα of the α-axis current from the variation quantity of this current in the sampling interval Ts of the α-axis current is by the equation (10); calculates the correction quantity H corresponding to the phase delay of Ts/2 (one half of the sampling interval Ts) according to equation (11); calculates the β-axis current iβ by the equation (12) by using the differentiated value (differential value) Δiα of the α-axis current iα and the correction quantity H, which corresponds to the Ts/2 phase delay. Subsequently, the detection part 18 calculates the current phase xθ relative to the W-phase from the α-axis current iα and the β-axis current iβ according to the equation (6).

Subsequently, the basic wave estimation part 19 calculates an estimation factor fu(xθ) according to the current phase xθ relative to the W-phase according to the equation (5), a data map or the like, and calculates the estimated U-phase current iu.est from the estimation factor fu(xθ) and the sensed W-phase current iw.sns according to the equation (4). Alternatively, the estimation part 19 may calculate an estimated current iu.est in the U-phase directly from the current phase xθ relative to the W-phase and the sensed W-phase current iw.sns according to the equation (3).

Generally, if an operational equation is packaged in a processing unit such as a control ECU (microcomputer), the unit processes the equation with discrete time, not continuous time, and handles sensed values and computed values as discrete values based on a specified resolution (LSB). Therefore, if a division by zero occurs in the equation (3), it is preferable to set a limit to the estimation factor fu(xθ) or the term 1/tan(xθ) in the factor in order to prevent the estimated current from being calculated as an unintended value under the influence of the discrete system. For the implementation of the equation (3), it is effective to map the estimation factor fu(xθ) or the term 1/tan(xθ) in this factor with the argument xθ in order to avoid multiplications and divisions, which are high in processing load. In this case, it is preferable to set a limit to the estimation factor fu(xθ) or the term 1/tan(xθ) on the map. Such measures facilitate application to a discrete system, making it possible to minimize the processing load on the microcomputer. Consequently, there is no need to replace the microcomputer with an expensive one that is high in processing performance.

Subsequently, if the sensed W-phase current iw.sns is 0 ampere, the zero-crossing time point interpolation part 20 interpolates the estimated current iu.est calculated as 0 ampere according to the equation (3) or (4) in the U-phase. Normally (when the W-phase current iw does not cross zero as will be described below), the interpolation part 20 directly outputs the estimated U-phase current iu.est input from the basic wave estimation part 19. When the W-phase current iw crosses zero (when the sensed current iw.sns is 0 ampere or in a specified range that includes 0 ampere and may be 10 amperes, 5 LSB, or another suitably set range, or be specified according to a numerical equation or the like), the interpolation part 20 fixes the command voltage phase ψ for the AC motor 13, interpolates the estimated U-phase current iu.est, outputs the interpolated current, and sets the interpolated current as an estimated current iu.est.fix in the U-phase for the d-q conversion. Alternatively, the interpolation part 20 may interpolate the estimated U-phase current iu.est by directly holding it at the previous value or a previous value of it. Alternatively, the interpolation part 20 may interpolate the estimated U-phase current iu.est by: holding the estimated d-axis current id.est and q-axis current iq.est at the previous values or previous values of them; performing an inverse d-q conversion for calculating the estimated U-phase current iu.est from the held currents id.est and iq.est; and interpolating the estimated U-phase current iu.est with the estimated currents obtained in the three phases by the inverse d-q conversion. The estimated U-phase current iu.est may be interpolated by being calculated by a part other than mentioned in this embodiment, or be interpolated by another suitable method.

Subsequently, the d-q conversion part 21 calculates the estimated d-axis current id.est and q-axis current iq.est by means of the d-q conversion from the sensed W-phase current iw.sns and the estimated U-phase current iu.est.fix for this conversion.

This avoids sharp fluctuations in the estimated U-phase current iu.est by interpolating it even if it cannot be calculated accurately when the W-phase current iw crosses zero. Mere interpolation of the estimated U-phase current iu.est may make the torque feedback control of the AC motor 13 unstable due to an error (estimation error made by the interpolation). However, the fixation of the command voltage phase ψ for the motor 13 excludes the influence of the error in the estimated U-phase current iu.est (prevents the command value IP from fluctuating due to the error). In case of controlling power supply to the A motor 13 by the current feedback sine wave PWM control method, the d-axis and the q-axis command voltages are fixed and the estimated current of the other phase is interpolated, when the current of the U-phase crosses zero.

Figure 7:
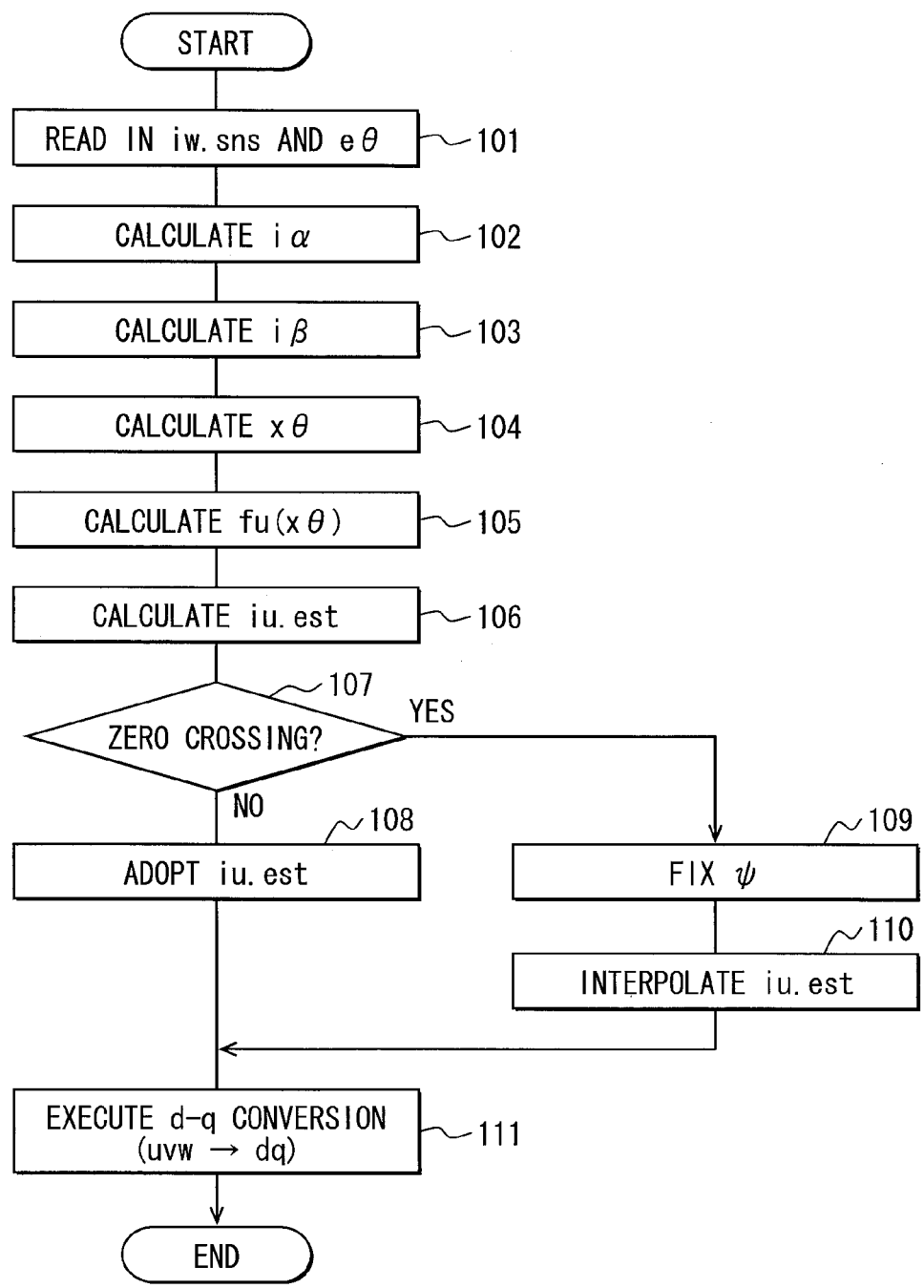
FIG. 7 is a flowchart of a current estimation routine of the AC motor control apparatus.

The motor control circuit 16 performs the foregoing current estimation in this embodiment according to the current estimation routine shown in FIG. 7.

The motor control circuit 16 repeats the current estimation routine (FIG. 7) at a specified operation period while the circuit is on. When the routine is started, the motor control circuit 16 reads in at step 101 the current iw.sns sensed in the W-phase by the current sensor 15 and the electrical angle eθ determined from the rotational rotor position me sensed by the rotational position sensor 14.

Subsequently, the routine proceeds to step 102, where the circuit 16 calculates the α-axis current iα according to the following equation from the W-phase current iw.sns.

$$i\alpha = K \times (3/2) \times iw.sns$$

Subsequently, the routine proceeds to step 103, where the motor control circuit 16 calculates the β-axis current iβ as follows.

First the differentiated value Δiα of the α-axis current iα based on the change quantity of the α-axis current iα in the sampling period Ts according to the following equation.

$$\Delta i\alpha = -\{i\alpha(n) - i\alpha(n-1)\}/Ts$$

Further, the correction quantity H, which corresponds to ½ of the sampling period Ts, is calculated according to the following equation.

$$H = \{i\alpha(n) + i\alpha(n-1)\}/2 \times (Ts/2)$$

Then the β-axis current iβ is calculated by using the differentiated value (differential value) Δiα of the α-axis current and the correction quantity H corresponding to Ts/2 phase delay according to the following equation. That is, the β-axis current iβ is calculated by correcting the differentiated value Δiα of the α-axis current by using the correction quantity H corresponding to Ts/2 phase delay.

$$i\beta = \Delta i\alpha + H$$

Subsequently, the current estimation routine proceeds to step 104, where the motor control circuit 16 calculates the current phase xθ relative to the W-phase from each α-axis current iα and the associated β-axis current iβ according to the following equation.

$$x\theta = \tan^{-1}(i\beta/i\alpha)$$

Subsequently, the current estimation routine proceeds to step 105, where the motor control circuit 16 calculates the estimation factor fu(xθ) according to the current phase xθ relative to the W-phase according to the equation (5) or the data map. Subsequently, the routine proceeds to step 106, where the motor control circuit 16 calculates the estimated current iu.est in the U-phase from the estimation factor fu(xθ) and the sensed W-phase current iw.sns according to the equation (4). Alternatively, the motor control circuit 16 may calculate an estimated current iu.est in the U-phase from the current phase xθ and the sensed W-phase current iw.sns according to the equation (3).

Subsequently, the current estimation routine proceeds to step 107, where the motor control circuit 16 checks whether the W-phase current iw is crossing zero. The checking depends on whether the sensed W-phase current iw.sns is 0 ampere. Alternatively, the checking may depend on whether the sensed W-phase current iw.sns is within the specified range including 0 ampere (for example, the absolute value of this current is equal to or smaller than a specified value, or the absolute value of the estimation factor fu(xθ) is equal to or larger than a specified value). Alternatively, the checking may depend on the current phase xθ relative to the W-phase because this phase is synchronous with the sensed W-phase current iw.sns.

If the motor control circuit 16 determines at step 107 that the W-phase current iw is not crossing zero, the current estimation routine proceeds to step 108, where the motor control circuit 16 adopts the estimated U-phase current iu.est calculated at step 106.

If the motor control circuit 16 determines at step 107 that the W-phase current iw is crossing zero, the current estimation routine proceeds to step 109, where the current control circuit 16 fixes the command voltage phase ψ. At step 109, the motor control circuit 16 may fix the command value ψ directly (for example, by holding it at the previous value of it) or by forcing the torque deviation Δtrq (FIG. 3) to be 0[N·m].

Subsequently, the current estimation routine proceeds to step 110, where the motor control circuit 16 interpolates the estimated U-phase current iu.est. At this step, the motor control circuit 16 may interpolate the estimated U-phase current iu.est by directly holding it at the previous value of it. Alternatively, the motor control circuit 16 may interpolate the estimated U-phase current iu.est by: holding the estimated d-axis current id.est and q-axis current iq.est at the previous values of them; performing an inverse d-q conversion for calculating the estimated U-phase current from the held currents id.est and iq.est; and interpolating the estimated U-phase current iu.est with the estimated currents obtained by the conversion. The estimated U-phase current iu.est may be interpolated by being calculated by means of other logic, or be interpolated by another suitable method.

After the motor control circuit 16 sets at step 108 or 110, the estimated U-phase current iu.est as the estimated U-phase current iu.est.fix for a d-q conversion, the current estimation routine proceeds to step 116, where the circuit executes the d-q conversion for calculating the estimated d-axis current id.est and q-axis current iq.est from the sensed W-phase current iw.sns and the estimated U-phase current iu.est.fix.

In this embodiment, the motor control circuit 16 calculates the current phase xθ relative to the W-phase from the α-axis current iα and β-axis current iβ in the fixed coordinate system (α-β coordinate system) on the basis of the W-phase. Accordingly, it is possible to calculate the actual current phase xθ relative to the W-phase. The motor control circuit 16 calculates the estimated U-phase current iu.est from the current phase xθ and the sensed W-phase current iw.sns. Accordingly, it is possible to calculate the estimated U-phase current iu.est accurately by taking into account the influence of harmonic components of the actual current phase xθ and fluctuations that may occur normally. This makes it possible to improve the accuracy in calculating the estimated U-phase current iu.est.

In this embodiment, with attention to the phase difference of 90 degrees between the α-axis current iα and β-axis current iβ (i.e., the currents iα and iβ are a sine wave and a cosine wave), the motor control circuit 16 calculates the α-axis current iα from the sensed W-phase current iw.sns, and also calculates the β-axis current iβ from a differentiated value Δiα of the α-axis current. Accordingly, it is possible to calculate the β-axis current iβ without using the command current in another phase. This makes it possible to apply the present technology to a system (for example, a system for controlling the electric power supply to the AC motor 13 by means of rectangular wave control) that does not use command currents (d-axis and q-axis command currents and three-phase command currents) when the motor control circuit 16 controls the electric power supply to the motor 13.

If the differentiated value Δiα of the α-axis current is calculated from the variation quantity of this current during the sampling interval Ts, the waveform of the differentiated value Δiα has the phase delay of Ts/2 relative to the waveform of the actual β-axis current iβ0. In this embodiment, with the phase delay of Ts/2 taken into account, the motor control circuit 16 determines the β-axis current iβ by correcting the differentiated value Δiα with a correction quantity H corresponding to the delay. Consequently, it is possible to accurately calculate the β-axis current iβ. The method for calculating the β-axis current iβ is one example. The β-axis current iβ may be calculated accurately by another suitable method.

In this embodiment, the motor control circuit 16 calculates the estimated U-phase current iu.est by calculating the estimation factor fu(xθ) according to the current phase xθ relative to the W-phase and multiplying the sensed W-phase current iw.sns by the factor. Accordingly, it is possible to calculate the estimated U-phase current iu.est without using current amplitude. This makes it possible to reduce the causes of errors in the estimated U-phase current iu.est, improving the accuracy in calculating it.

In this embodiment, it is possible to accurately calculate the estimated d-axis current id.est and q-axis current iq.est from the sensed W-phase current iw.sns and the estimated U-phase current iu.est. It is possible to stably drive the AC motor 13 by means of the torque feedback control with the estimated d-axis current id.est and q-axis current iq.est.

In this embodiment, the motor control circuit 16 estimates the current in one phase from the current sensed in another. This excludes the influence of gain errors that may be made by the plurality of current sensors of a conventional AC motor control apparatus. Consequently, it is possible to prevent fluctuations that may otherwise be caused in the output torque from the AC motor 13 by gain errors. This makes it possible to exclude factors that may otherwise reduce the commercial value of the vehicle.

In this embodiment, the AC motor 13 is controlled without using command currents (d-axis and q-axis command currents or three-phase command currents) in a system, in which the AC motor 13 is controlled, for example, by the rectangular wave control method. However the AC motor 13 may be controlled by using the command currents (d-axis and q-axis command currents or three-phase command currents) in a system, in which the AC motor 13 is controlled, for example, by the sine wave PWM control method.

In this embodiment, the motor control circuit 16 determines the β-axis current iβ by correcting each differentiated value Δiα of the α-axis current with the correction quantity H corresponding to the phase delay of Ts/2. However, by way of example, if the sampling interval Ts is sufficiently short, and if the phase delay of Ts/2 is sufficiently little, each differentiated value Δiα of the α-axis current may, without being corrected, be adopted as the β-axis current iβ. Further the differentiated value Δiα of the α-axis current may be calculated by any other methods as long as the β-axis current (cos) can be derived from the α-axis current (sin).

In this embodiment, the current sensor 15 senses the current in the W-phase as the sensor phase. Alternatively, the sensor 15 may be connected to sense the current in the U-phase or V-phase as the sensor phase. In this embodiment, the motor control circuit 16 calculates an estimated current in the U-phase as another phase. Alternatively, the motor control circuit 16 may calculate an estimated current in the V-phase or W-phase as another phase. Further, the motor control circuit 16 may calculate estimated currents in other two phases other than the sensor phase.

In this embodiment, the apparatus is provided with only one inverter and only one AC motor. Alternatively, the apparatus may be provided with two or more inverters and two or more AC motors. Alternatively, the apparatus may include an inverter and two or more AC motors connected in parallel to the inverter, as exemplified in an electric train.

In order to prevent the d-q conversion from being disabled because of the current sensed in only one phase, the d-q conversion is enabled by estimating the current in another phase. Alternatively, a new d-q conversion formula may be created that is effective even for the current sensed in only one phase. However, either method provides a mathematically equal result.

The apparatus is not limited to hybrid vehicles of the structure shown in FIG. 1. The apparatus can be applied to hybrid and electric vehicles of any structure. The apparatus is not limited to the AC motor control apparatus fitted on an electric vehicle or a hybrid vehicle but can be applied to other AC motor control apparatus as well.

What is claimed is:

1. An AC motor control apparatus for a system, which includes a three-phase AC motor having a first phase, a second phase and a third phase, an inverter for driving the AC motor and a current sensor for sensing a current flowing in the first phase, the AC motor control apparatus comprising:

a controlling part for controlling electric power supply to the AC motor, the controlling part including a current estimating part configured to calculate a current phase relative to the first phase from an α-axis current and a β-axis current in a fixed coordinate system set with an α-axis and a β-axis, the α-axis extending in a same direction as an axis of the first phase extends, the β-axis being perpendicular to the axis of the first phase, and calculating an estimated current in at least the second phase from the current phase relative to the first phase and the sensed current in the first phase, wherein the current estimating part is configured to calculate the α-axis current from the sensed current in the first phase and calculate the β-axis current from a differentiated value of the α-axis current.

2. The AC motor control apparatus according to claim 1, wherein:

the current estimating part is further configured to calculate the β-axis current by calculating the differentiated value of the α-axis current from a variation quantity of the α-axis current in a sampling interval of the α-axis current and by correcting the differentiated value of the α-axis current with a correction quantity corresponding to a phase delay that is ½ of the sampling interval.

3. The AC motor control apparatus according to claim 1, wherein:

the current estimating part is further configured to calculate the estimated current in at least the second phase by calculating an estimation factor corresponding to a reference current phase of the first phase and multiplying the sensed current in the first phase by the estimation factor.

4. The AC motor control apparatus according to claim 1, wherein:

the current estimating part is further configured to calculate an estimated d-axis current and an estimated q-axis current in a rotational coordinate system of the AC motor from the sensed current in the first phase and the estimated current in the second phase; and the controlling part is configured to control the electric power supply to the AC motor with the estimated d-axis and q-axis currents.

5. The AC motor control apparatus according to claim 2, wherein:

the current estimating part is further configured to calculate the estimated current in at least the second phase by calculating an estimation factor corresponding to a reference current phase of the first phase and multiplying the sensed current in the first phase by the estimation factor.

6. The AC motor control apparatus according to claim 2, wherein:

the current estimating part is further configured to calculate an estimated d-axis current and an estimated q-axis current in a rotational coordinate system of the AC motor from the sensed current in the first phase and the estimated current in the second phase; and the controlling part is configured to control the electric power supply to the AC motor with the estimated d-axis and q-axis currents.

7. The AC motor control apparatus according to claim 3, wherein:

the current estimating part is further configured to calculate an estimated d-axis current and an estimated q-axis current in a rotational coordinate system of the AC motor from the sensed current in the first phase and the estimated current in the second phase; and the controlling part is configured to control the electric power supply to the AC motor with the estimated d-axis and q-axis currents.

* * * * *